(Model.)

A. FRAZIER & D. J. COBURN.
BROOM HOLDER.

No. 295,379.  Patented Mar. 18, 1884.

WITNESSES:
C. Neveux
C. Sedgwick

INVENTOR:
A. Frazier
D. J. Coburn
BY Munn & Co.
ATTORNEYS.

UNITED STATES PATENT OFFICE.

ALEXANDER FRAZIER AND DANIEL J. COBURN, OF MAYWOOD, ILLINOIS.

BROOM-HOLDER.

SPECIFICATION forming part of Letters Patent No. 295,379, dated March 18, 1884.

Application filed August 31, 1883. (Model.)

*To all whom it may concern:*

Be it known that we ALEXANDER FRAZIER and DANIEL J. COBURN, both of Maywood, in the county of Cook and State of Illinois, have invented certain new and useful Improvements in Broom-Holders, of which the following is a full, clear, and exact description.

The object of this invention is to produce a cheap, simple, and durable device for securely holding brooms by their handles when not in use without regard to length of the handle or portion thereof inserted in the holder, and which, furthermore, shall be self-adjusting to different thicknesses of handle, and shall be automatic in its hold on the handle, and afford every facility for quickly entering and removing the broom or handle portion of it.

The invention consists in a rubber jaw-like clamp, and box for holding said clamp, constructed substantially as hereinafter described, the whole forming a spring broom-holder having the above-named advantages, and in which the rubber clamp is prevented from being accidentally detached from its box.

Reference is to be had to the accompanying drawings, forming part of this specification, in which similar letters of reference indicate corresponding parts in all the figures.

Figure 1:
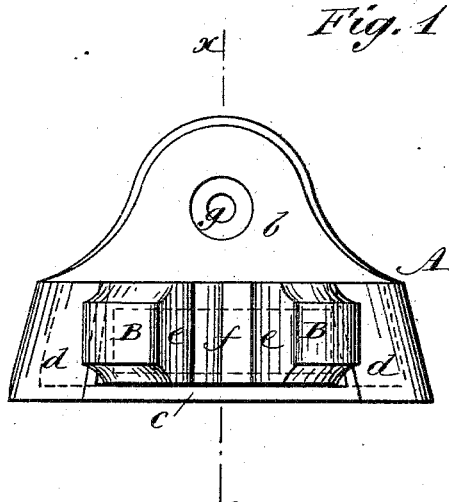
Figure 2:
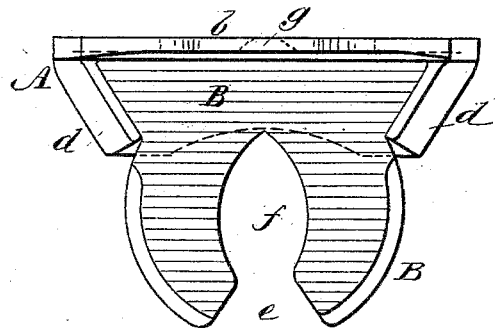
Figure 3:
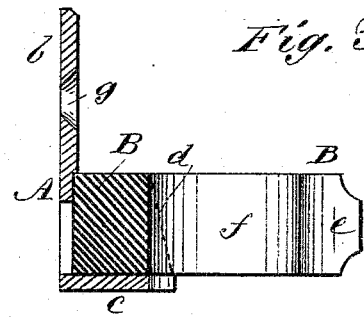

Figure 1 represents a front view of a broom-holder embodying our invention. Fig. 2 is a plan thereof, and Fig. 3 a vertical section of the same on the line $x$ $x$ in Fig. 1.

A is the box of the holder, which may be made of cast metal or any other suitable material, and is constructed with a back, $b$, a bottom, $c$, and sides $d$ $d$. These sides are made to converge both in a forward direction and in an upward direction, as shown in Figs. 1 and 2, whereby a double-dovetail locking space or chamber is formed in the box for the reception and retention of the jaw-like rubber clamp B, which is of suitable shape in its rear to admit of being forced or pressed into said chamber, and so that the rubber clamp cannot be accidentally detached from the box, or be displaced therefrom in the manipulation of the broom-handle when entering it within or removing it from the broom-holder; or so that, in fact, it cannot be detached without tearing it out. This rubber clamp B is arranged to project in front of the box A, and is constructed to form two elastic side jaws separated by a central opening extending from its front toward its back, and shaped to constitute an outwardly-flaring mouth, $e$, and elongated receiving or broom-handle-holding space $f$, which is more or less contracted in direction of its width.

The entire device may either be pendent on or be secured to a wall or other support by a nail or screw passing through a hole, $g$, in the back of the box.

To place a broom by its handle within the holder, said handle may be slightly canted or turned to facilitate its entry within the receiving-space $f$, where it will be clutched and securely held by the rubber clamp, from which, however, it may readily be removed when required.

The device is not necessarily restricted to holding brooms, but may be used as a holder for sticks, canes, and other articles.

We are aware that holders provided with combined inwardly and upwardly extending walls are common in lathe-chuck jaws, and elsewhere; and we are also aware that a jaw-like rubber broom-clamp inserted in a box or holder has heretofore been employed; and we therefore lay no claim, broadly, to such construction.

Having thus described our invention, what we claim as new, and desire to secure by Letters Patent, is—

The box A, constructed with a clamp-holding chamber having its sides $d$ $d$ arranged to incline toward each other both in a forward and upward direction, in combination with the jaw-like rubber clamp B, arranged to fit within said chamber, and to project in front thereof, and constructed with a receiving-space, $f$, and flaring mouth $e$, substantially as and for the purposes herein set forth.

ALEXANDER FRAZIER.
DANIEL J. COBURN.

Witnesses:
I. PRESTON,
S. STERNBRIDGE.